United States Patent
Fang

(10) Patent No.: US 7,706,849 B2
(45) Date of Patent: Apr. 27, 2010

(54) MOBILE COMMUNICATION DEVICES WITH INTERNAL ANTENNAS

(75) Inventor: Shyh-Tirng Fang, Tai-Nan (TW)

(73) Assignee: Mediatek Inc., Hsin-Chu (TW)

( * ) Notice: Subject to any disclaimer, the term of this patent is extended or adjusted under 35 U.S.C. 154(b) by 830 days.

(21) Appl. No.: 11/424,032

(22) Filed: Jun. 14, 2006

(65) Prior Publication Data

US 2007/0197267 A1    Aug. 23, 2007

Related U.S. Application Data

(60) Provisional application No. 60/775,575, filed on Feb. 22, 2006, provisional application No. 60/780,007, filed on Mar. 7, 2006.

(51) Int. Cl.
*H04M 1/00* (2006.01)

(52) U.S. Cl. .......... 455/575.2; 455/556.1; 455/557; 455/569.1

(58) Field of Classification Search .......... 455/575.2, 455/575.1, 550.1, 186.1, 3.01, 414.1, 41.2, 455/3.02, 412.1, 562.1, 568, 557, 569.1; 439/668; 381/384, 370

See application file for complete search history.

(56) References Cited

U.S. PATENT DOCUMENTS

| | | | |
|---|---|---|---|
| 6,970,140 B2 | 11/2005 | Hibino et al. | |
| 7,292,705 B2 * | 11/2007 | Harano | 381/384 |
| 2003/0144040 A1 * | 7/2003 | Liu et al. | 455/568 |
| 2005/0020245 A1 * | 1/2005 | Su et al. | 455/412.1 |
| 2005/0094840 A1 | 5/2005 | Harano | |
| 2005/0170799 A1 * | 8/2005 | Strandberg et al. | 455/186.1 |
| 2005/0245234 A1 * | 11/2005 | Stopek | 455/411 |
| 2006/0068856 A1 * | 3/2006 | Zhu et al. | 455/575.1 |
| 2006/0099993 A1 * | 5/2006 | Leinonen et al. | 455/562.1 |
| 2007/0042709 A1 * | 2/2007 | Krieger et al. | 455/3.02 |
| 2008/0039043 A1 * | 2/2008 | Yamazaki et al. | 455/269 |

FOREIGN PATENT DOCUMENTS

| | | |
|---|---|---|
| CN | 1291838 | 4/2001 |
| CN | 2567800 | 8/2003 |
| CN | 1658524 | 8/2005 |
| JP | 2000354336 | 12/2000 |
| JP | 2005064742 | 3/2005 |
| WO | WO2006011322 | 2/2006 |

OTHER PUBLICATIONS

CN Office Action mailed Aug. 29, 2008.
English abstract of CN2567800, pub. Aug. 20, 2003.
TW Office Action mailed Jun. 16, 2009.
English Abstract of JP2005064742, Mar. 10, 2005.
English Abstract of JP2000354336, Dec. 19, 2000.

* cited by examiner

*Primary Examiner*—Tan Trinh
(74) *Attorney, Agent, or Firm*—Thomas, Kayden, Horstemeyer & Risley

(57) ABSTRACT

A mobile communication device comprises an internal antenna device for receiving low-band signals of operating frequency band below 1 GHz, and the internal antenna device can be connected in series or parallel with an external antenna such as an earphone. The mobile communication device of the invention uses the internal antenna device for receiving low-band signals, enabling radio alarm function and timed recording of radio programs without plugging in an external earphone.

9 Claims, 10 Drawing Sheets

MOBILE COMMUNICATION DEVICES WITH INTERNAL ANTENNAS

CROSS REFERENCE TO RELATED APPLICATIONS

This application claims the full benefit and priority of provisional U.S. Patent Application Ser. No. 60/775,575, filed Feb. 22, 2006, entitled "An Electrically Small Antenna Apparatus", inventor Fang, and provisional U.S. Patent Application Ser. No. 60/780,007, filed Mar. 7, 2006, entitled "An Electrically Small Antenna Apparatus", inventor Fang, and incorporates the entire contents of said applications herein.

BACKGROUND OF THE INVENTION

1. Field of the Invention

The invention relates to a mobile communication device, and in particular relates to a mobile communication device with an internal antenna capable of receiving low-band signals without plugging an external earphone.

2. Description of the Related Art

Design goals for personal mobile communication devices or wireless terminal equipment focus on light weight, thinness, compact profile and good communication quality. Mobile phones, for example, feature small streamlined models with multiple functions and applications, and low cost.

Wireless communication apparatus requires more than one antenna such that multiple communication systems can be integrated and applied. Hence, it becomes a design issue and a critical problem to arrange the antennas in the wireless communication equipment and determine dimensions of antennas. In mobile phones or handsets, GSM systems of 850/900/1800/1900 MHz, WCDMA or CDMA2000 system, Bluetooth system and wireless LAN of 2400 or 5200/5800 MHz may be integrated into a single mobile phone, requiring more than 3 antennas. Fortunately, GSM, WCDMA, CDMA2000, Bluetooth and wireless LAN systems all operate in a frequency band around or above 1 GHz, such that necessary antennas can be configured in the mobile phone with great effort by designing the antennas based on ¼ wavelength antenna.

FIG. 1 shows a wireless communication apparatus with plural wireless communication units (or systems) integrated therein. The wireless communication apparatus 100, for example, a handset or a mobile phone, comprises a transceiver/RF unit 101 for processing communications with a base station, a baseband unit 102, a FM/AM unit 103, a DTV (Digital TV) unit 104, a Bluetooth unit 105, a Wi-Fi unit 106 and GPS unit 107. It is noted that HF, VHF and UHF units, such as the FM/AM unit 103 and DTV unit 104, operate in the frequency band below 1 GHz, therefore requiring antennas with greater length and dimension when using ¼ wavelength antennas. Because the dimension of the antenna for the FM/AM unit 103 or DTV unit 104 is too large to be configured into the handset or mobile phone, manufacturers configure either HF, VHF or UHF antenna outside the housing of the handset, or enlarge dimensions of the handset to enclose large HF, VHF or UHF antenna, hence inevitably degrading elegant profile of the handset (or mobile phone) and increasing production costs.

FIG. 2 shows a conventional handset (or mobile phone) 200 with FM/AM unit 201. External earphone 202, plugged into an earphone jack 203, serves as an antenna for receiving FM/AM signals. FM/AM signals are input to an antenna terminal 204 of the FM/AM unit 201, and the FM/AM unit 201 outputs stereo audio signals Ste_R and Ste_L to the external earphone 202 or speakers Sp_R and Sp_L through amplifiers 205. However, it is inconvenient for users to prepare earphones to listen FM/AM radios. Functions for setting FM/AM alarm clocks and timed recording of FM programs cannot be obtained without plugging the external earphone.

BRIEF SUMMARY OF INVENTION

The invention is directed to a mobile communication device with an internal antenna device for receiving low-band signals of operating frequency band below 1 GHz, the internal antenna device connected in series or parallel with an external antenna such as an earphone.

The invention is also directed to a mobile communication device with a low-band circuit and an internal antenna device for receiving low-band signals such that the mobile communication device can drive the low-band circuit to perform radio (broadcast) alarm function without requiring an external earphone.

The invention is further directed to a mobile communication device with a low-band circuit and an internal antenna device for receiving low-band signals such that the mobile communication device can perform timed recording of radio (broadcast) programs without requiring an external earphone.

To achieve the above objects, an exemplary embodiment of the invention provides a mobile communication device comprising: an earphone jack having at least a first, second and third terminal, the first and second terminals coupling audio signals to an external earphone plugged into the earphone jack, the third terminal defined to connect an auxiliary conduction line of the external earphone, a low-band unit processing low-band signals to generate the audio signals, having an antenna terminal coupled to the third terminal, and an internal antenna device, having a signal-feeding terminal coupled to the antenna terminal.

To achieve the above objects, another exemplary embodiment of the invention provides a mobile communication device comprising: an earphone jack having at least a first, second and third terminal, the first and second terminals coupling audio signals to an external earphone plugged into the earphone jack, the third terminal defined to connect an auxiliary conduction line of the external earphone, a low-band unit processing low-band signals to generate the audio signals, having an antenna terminal, and an internal antenna device having a signal-feeding terminal and a second terminal respectively coupled to the antenna terminal and the third terminal.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

For brevity, handsets (mobile phones) are used here as examples of mobile communication devices to describe the invention. Applications, however, are not limited to handsets or mobile phones. Any wireless device can be applied with the disclosure. Similar or the same components and units in the following figures are indicated by the same numerals or notations for brevity.

Figure 1:
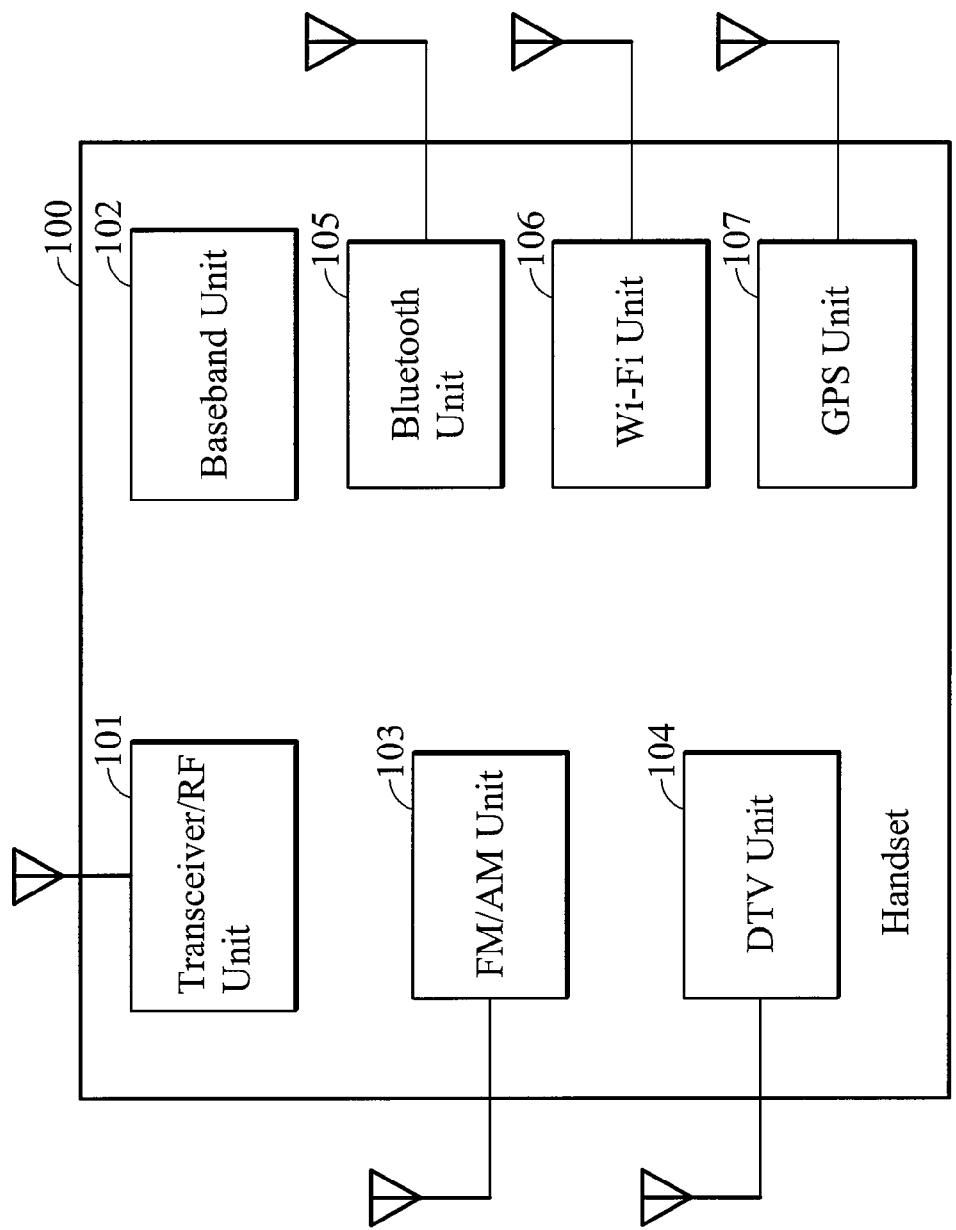
FIG. 1 shows a wireless communication apparatus with plural wireless communication units integrated therein.
Figure 2:
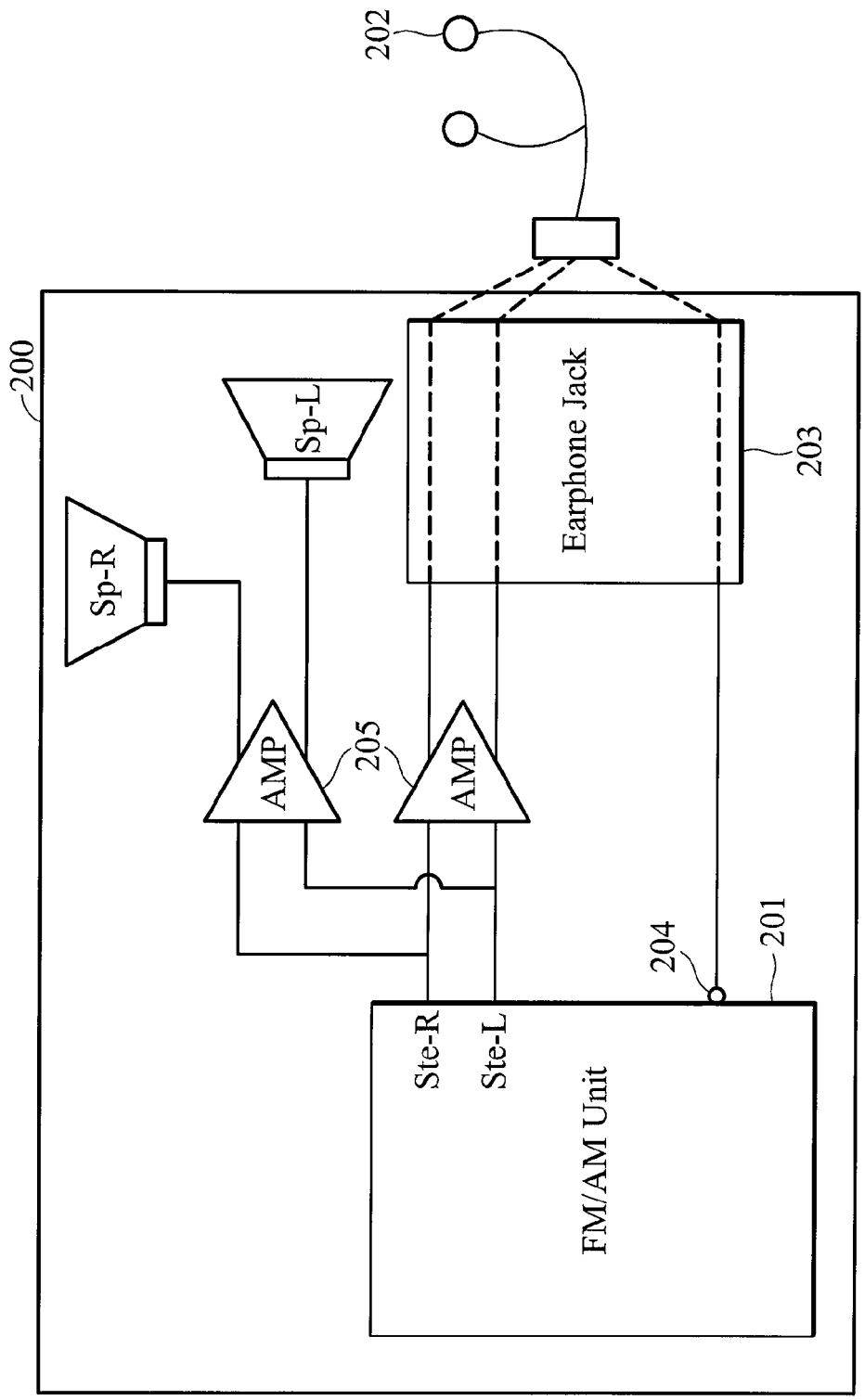
FIG. 2 shows a conventional handset (or mobile phone) with FM/AM unit.
Figure 3:
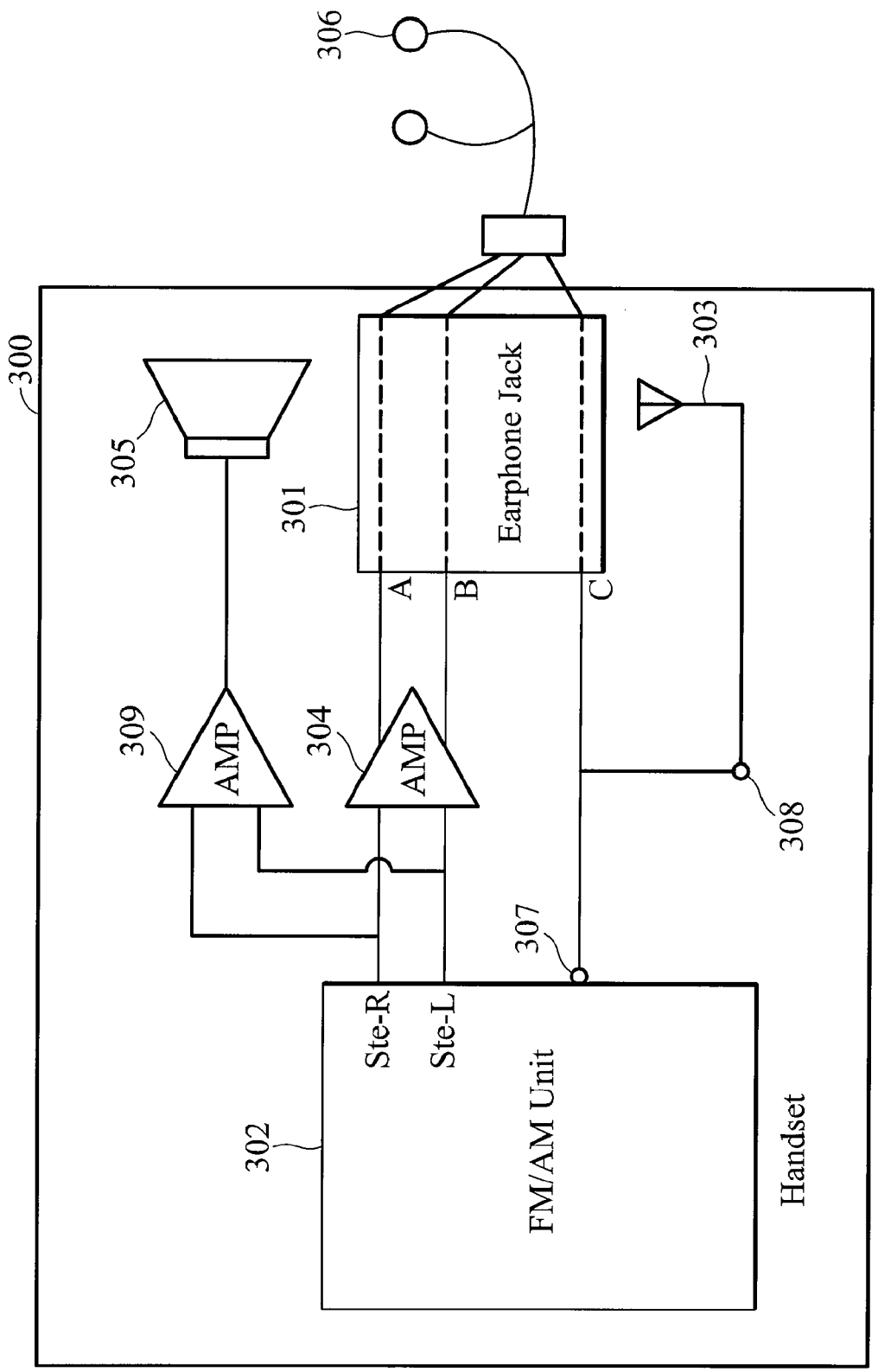
FIG. 3 shows an exemplary embodiment of a handset (or mobile phone) according to the invention.

FIG. 3 shows an exemplary embodiment of a handset (or mobile phone) according to the invention. The handset 300 comprises an earphone jack 301, a low-band circuit 302, an internal antenna device 303, amplifiers 304, 309 and a speaker 305. For brevity, RF module and main antenna for communications with a base station are not depicted in FIG. 3. The phone jacket 301 has at least a first terminal A, a second terminal B and a third terminal C, wherein the first and second terminals A and B couple stereo audio signals Ste_R and Ste_L through the amplifier 304 to an external earphone 306 plugged into the earphone jack 301, and the third terminal is defined to connect an auxiliary conduction line of the external earphone 306. The auxiliary conduction line (not shown in FIG. 3) can be the ground line of the earphone 306 or another line not used to transmit signals.

The low-band unit 302 processes low-band signals such as HF, VHF and UHF signals of operating frequency band below 1 GHz to generate the stereo audio signals Ste_R and Ste_L amplified and transmitted to the speaker 305 and the external earphone 306. In this embodiment, the low-band unit 302 is an FM/AM unit (or a DTV unit), having an antenna terminal 307 coupled to the third terminal C of the earphone jack 301. When the external earphone 306 is plugged into the earphone jack 301, the auxiliary conduction line serves as an external antenna to receive FM/AM signals for the FM/AM unit 302.

The internal antenna device 303 has a signal-feeding terminal 308 coupled to the antenna terminal 307, and is connected in parallel to the auxiliary conduction line (the external antenna) when the external earphone 306 is plugged into the earphone jack 301. It is noted that the dimension of the auxiliary conduction line (the external antenna) usually exceeds that of the internal antenna device 303, and therefore has larger antenna gain than that of the internal antenna device 303, dominating reception of FM/AM signals, when the external earphone 306 is plugged into the earphone jack 301. The internal antenna device 303 enables the FM/AM unit 302 to receive FM/AM signals without plugging the external earphone 306.

Figure 4:
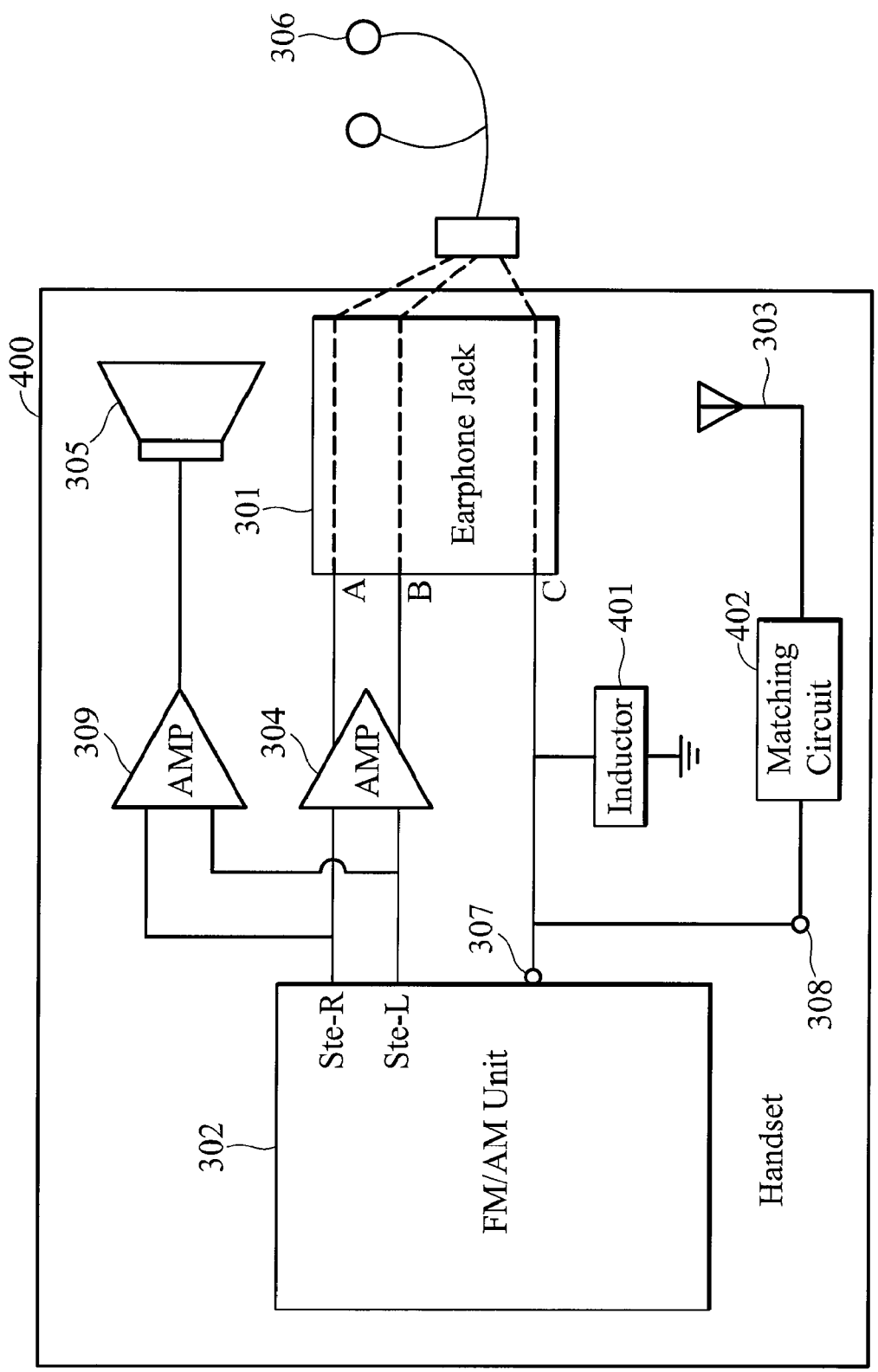
FIG. 4 shows another exemplary embodiment of a handset according to the invention.

FIG. 4 shows another exemplary embodiment of a handset according to the invention. The handset 400 further comprises an inductor (or inductive device) 401 connected between the third terminal C and a reference ground, providing a ground signal to the external earphone 306. The handset 400 further comprises a matching circuit 402 coupled between the signal-feeding terminal 308 of the internal antenna device 303 and the antenna terminal 307 of the FM/AM unit 302, for improving impedance matching between the internal antenna device 303 and the FM/AM unit 302.

Figure 5:
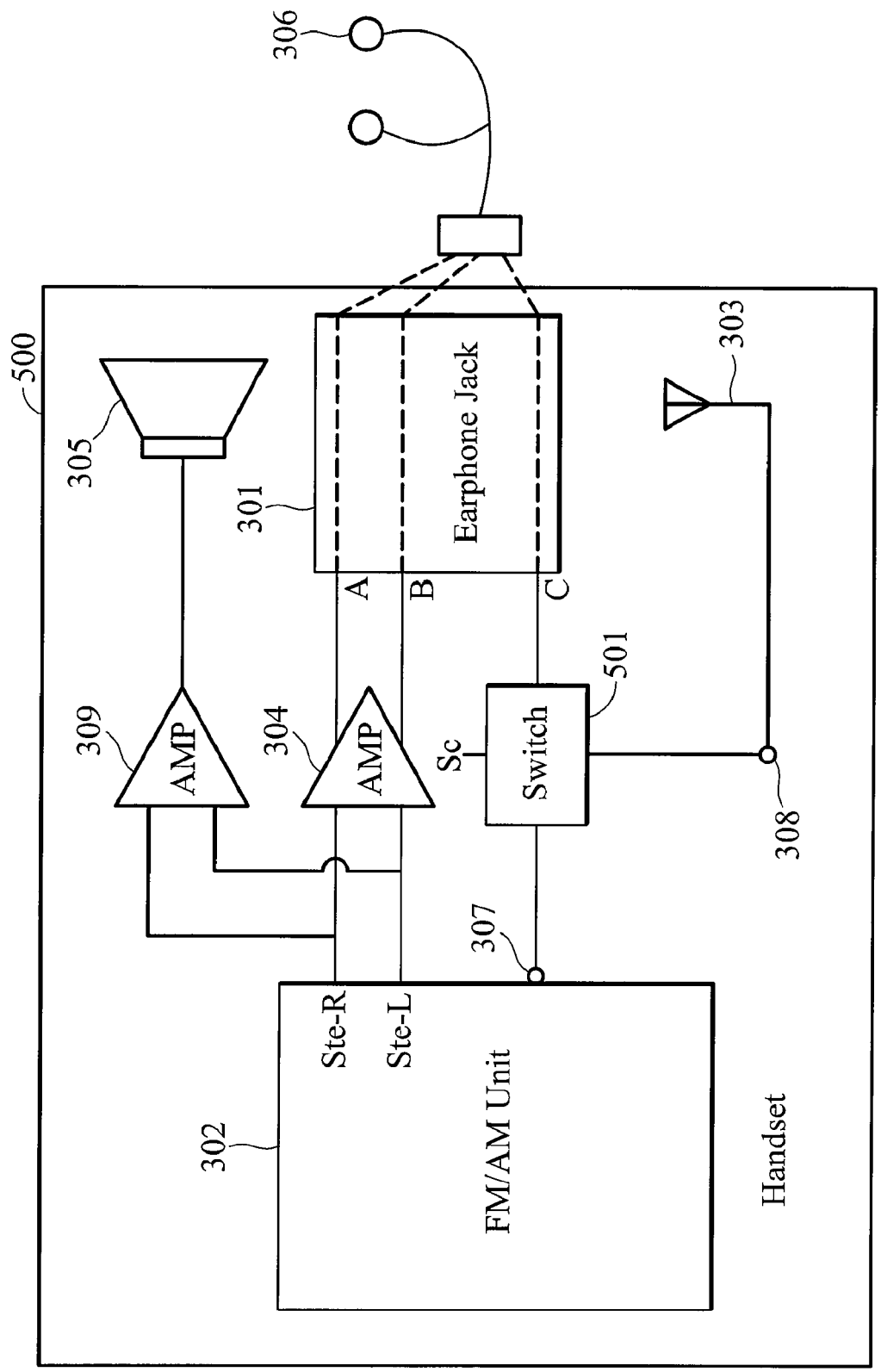
FIG. 5 shows another exemplary embodiment of a handset according to the invention.

FIG. 5 shows another exemplary embodiment of a handset according to the invention. The handset 500 further comprises a switch 501 coupled to the antenna terminal 307, the signal-feeding terminal 308 and the third terminal C. The switch 501 selectively connects the signal-feeding terminal 308 or the third terminal C to the antenna terminal 307 according to a control signal Sc. For example, the control signal Sc can respond to plugging of the external earphone 306, and drive the switch 501 to connect the signal-feeding terminal 308 to the antenna terminal 307 when the external earphone 306 is not plugged in, otherwise connecting the third terminal C to the antenna terminal 307 when the external earphone 306 is plugged in.

Figure 6:
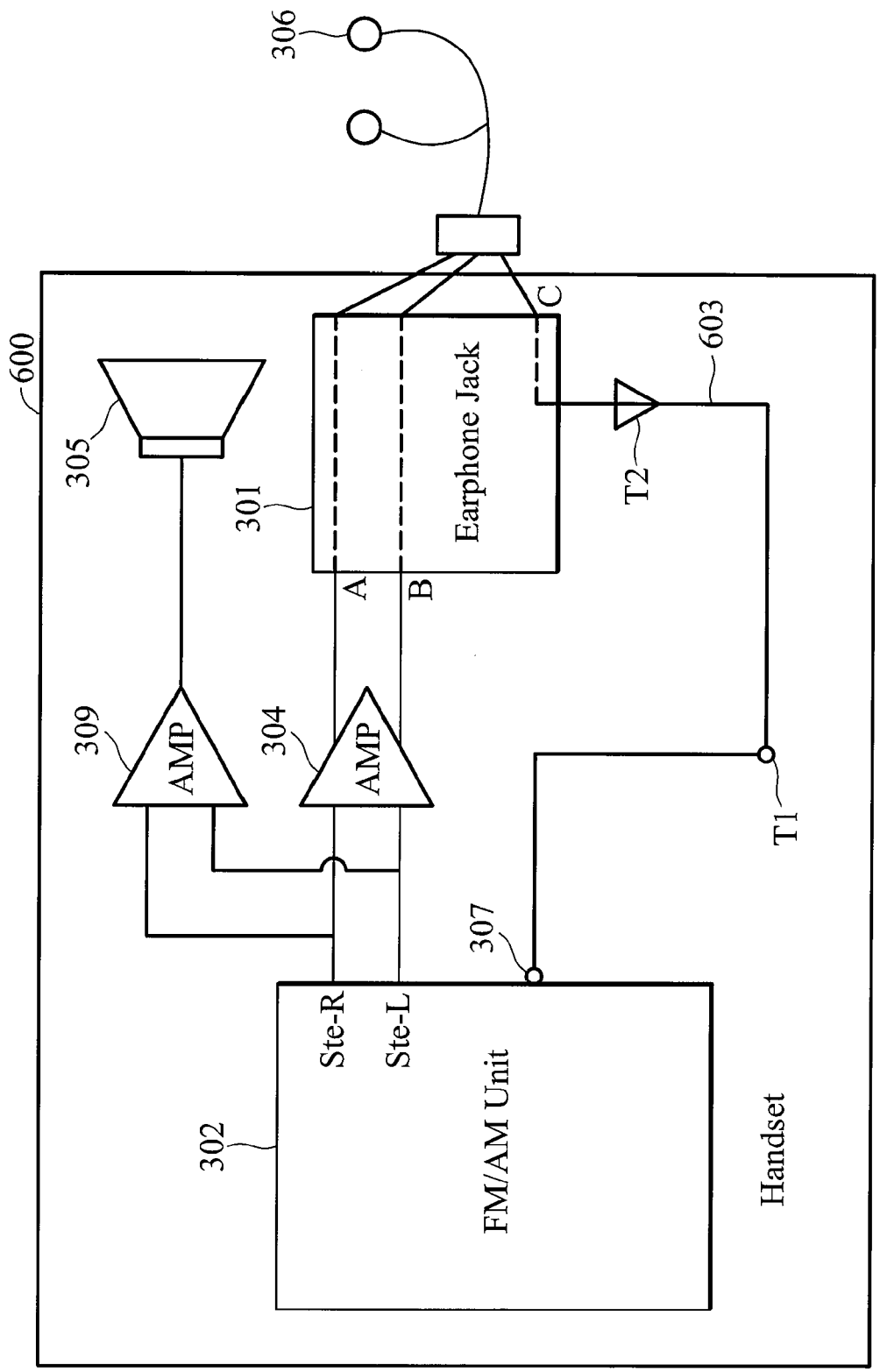
FIG. 6 shows another exemplary embodiment of a handset according to the invention.

FIG. 6 shows another exemplary embodiment of a handset according to the invention. The handset 600 depicted in FIG. 6 comprises almost the same components as depicted in FIG. 3 except for the arrangement of the internal antenna device 603. In this embodiment, the internal antenna device 603 has a signal-feeding terminal T1 coupled to the antenna terminal 307 of the FM/AM unit 302, and a terminal T2 coupled to the third terminal C. Therefore, the internal antenna device 603 is connected in series with the auxiliary conduction line (the external antenna) when the external earphone 306 is plugged into the earphone jack 301. The external antenna (auxiliary conduction line) and the internal antenna device 603 work together to receive the FM/AM signals, when the external earphone 306 is plugged into the earphone jack 301. Also, the internal antenna device 603 enables the FM/AM unit 302 to receive FM/AM signals without plugging the external earphone 306.

Figure 7:
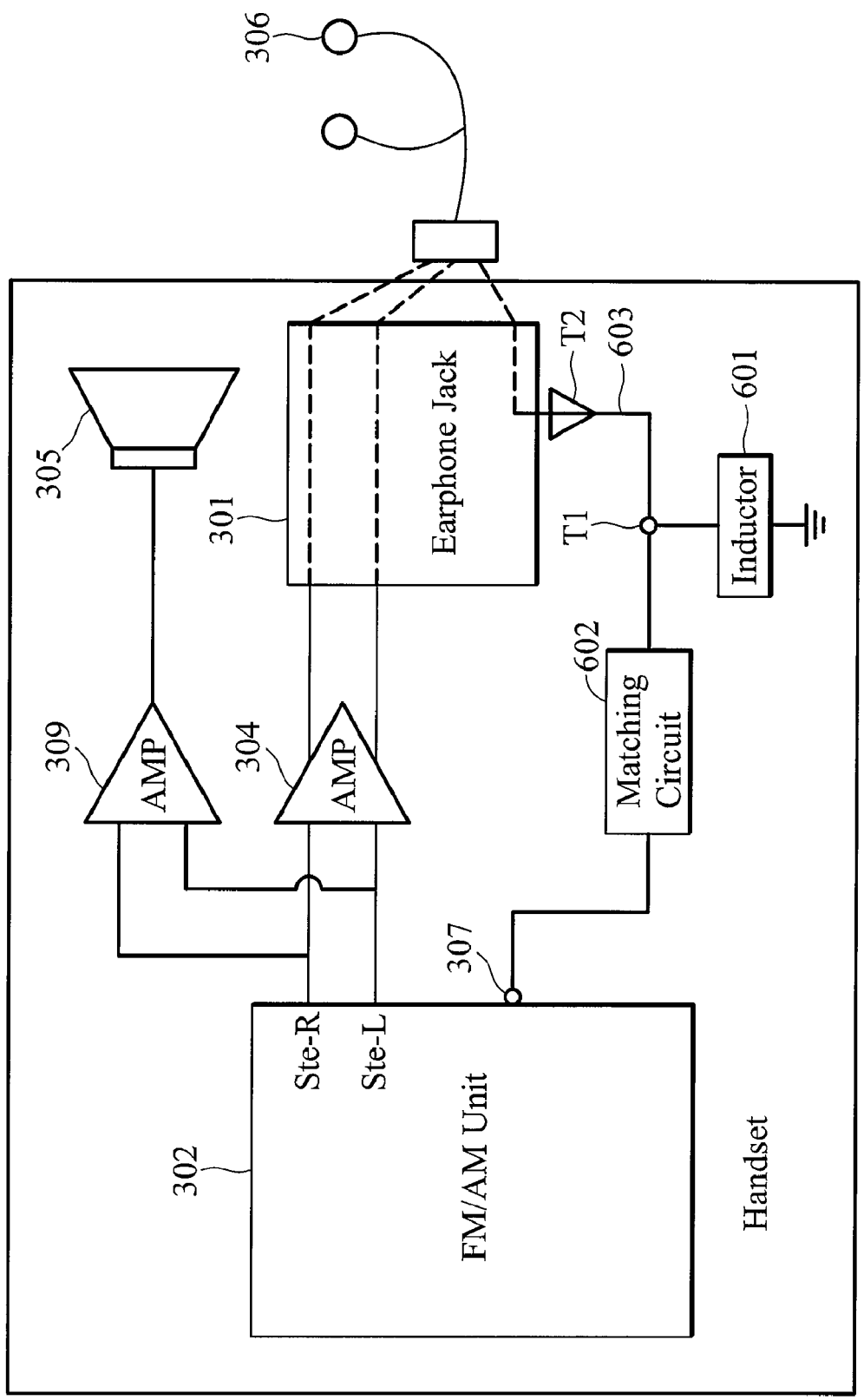
FIG. 7 shows another exemplary embodiment of a handset according to the invention.

FIG. 7 shows another exemplary embodiment of a handset according to the invention. The handset 600 further comprises an inductor (or inductive device) 601 connected between the signal-feeding terminal T1 and a reference ground, providing a ground signal to the external earphone 306. The handset 600 further comprises a matching circuit 602 coupled between the signal-feeding terminal T1 of the internal antenna device 603 and the antenna terminal 307 of the FM/AM unit 302, improving impedance matching between the internal antenna device 603 and the FM/AM unit 302.

In the embodiments depicted in FIGS. 3 to 7, each internal antenna device has a length shorter than its ¼ operating wavelength so as to fit inside the handsets or mobile phones. These internal antenna devices can be implemented by using the antenna devices disclosed by U.S. Pat. No. 6,970,140; or a co-pending patent of the inventor, application Ser. No. 11/424,041, filed Jun. 14, 2006, entitled "ANTENNA APPARATUS AND MOBILE COMMUNICATION DEVICE USING THE SAME". However, it should be noted that this is not the only implementation of the internal antenna device of the present invention. Any other internal antenna devices may be used in the present invention.

Figure 8:
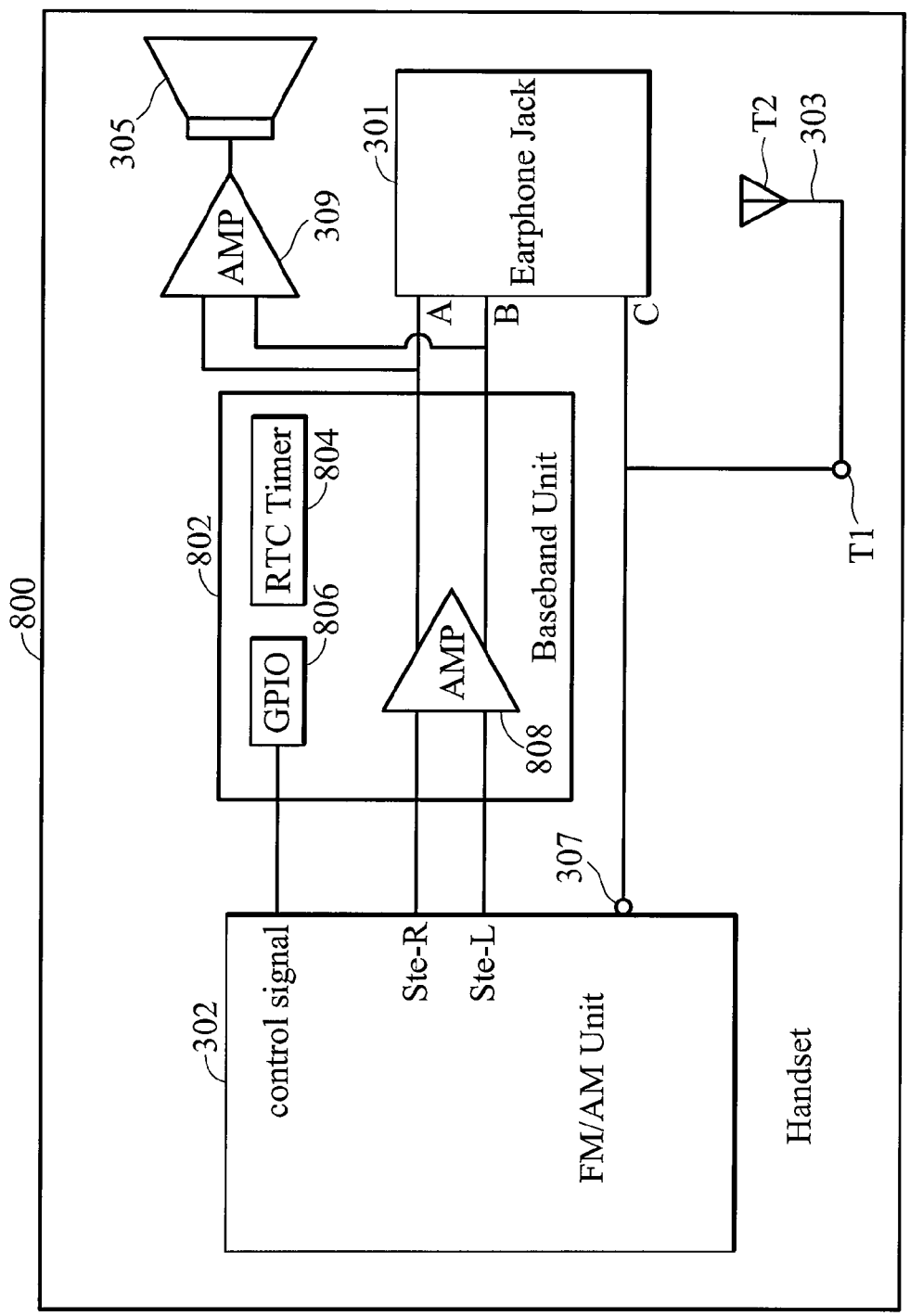
FIG. 8 shows an exemplary embodiment of a handset capable of setting FM/AM alarm function without plugging in an external earphone.
Figure 9:
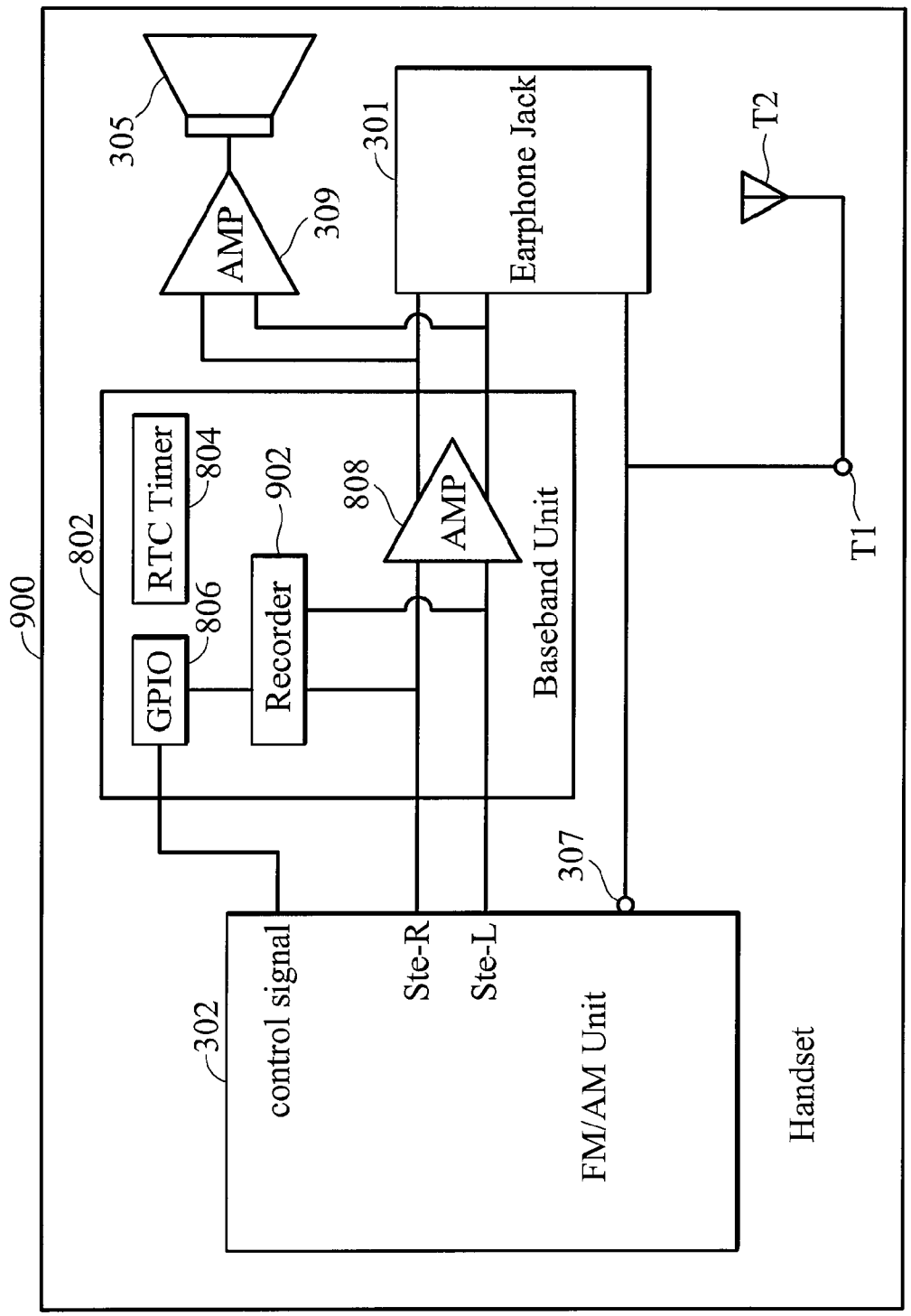
FIG. 9 shows an exemplary embodiment of a handset capable of performing timed recording without plugging in an external earphone.
Figure 10:
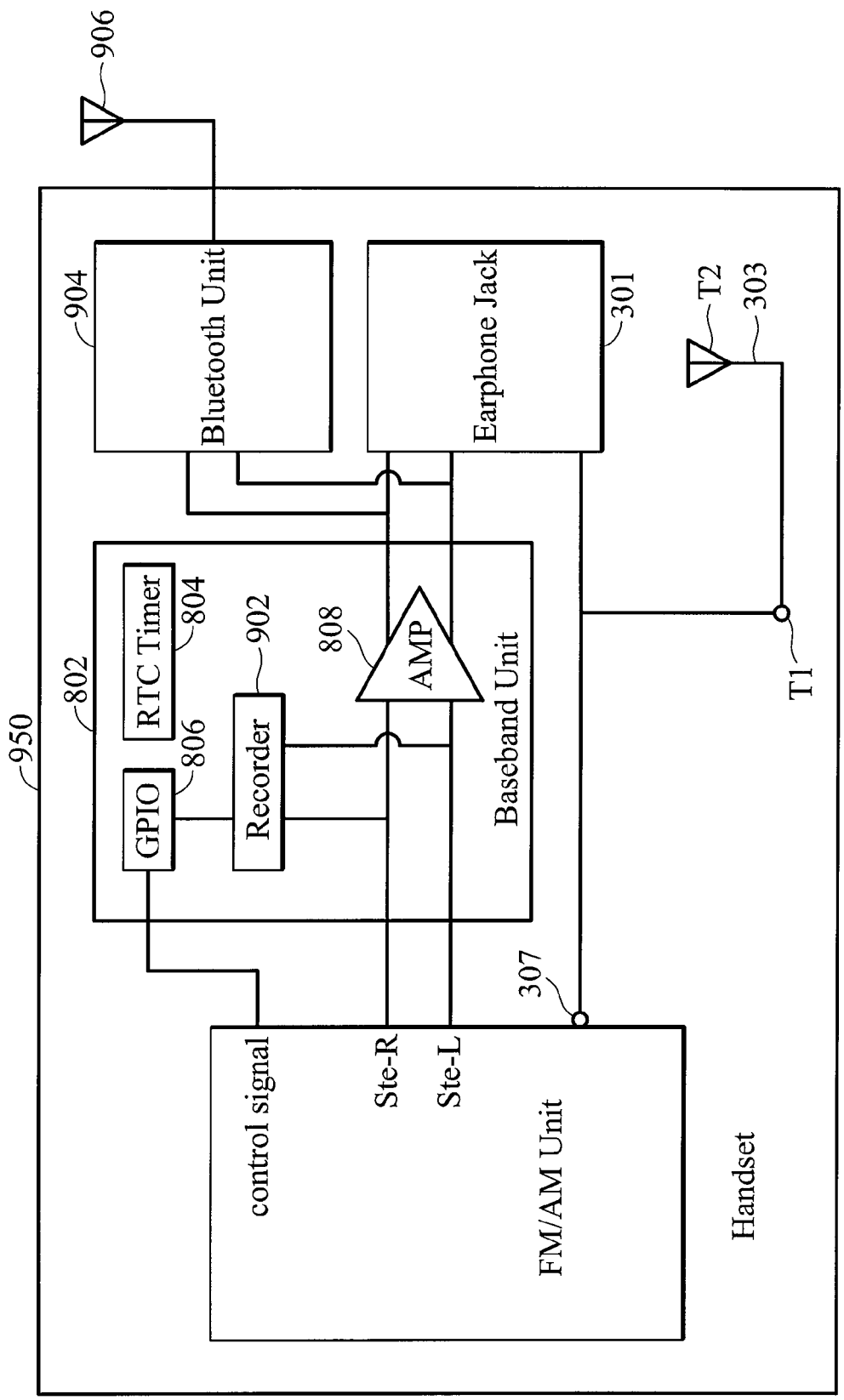
FIG. 10 shows an exemplary embodiment of a handset with a Bluetooth unit according to the invention.

The present invention can facilitate a lot of applications for handsets. FIG. 8 to FIG. 10 illustrates some embodiments of the present invention that facilitate applications for handsets.

FIG. 8 shows an exemplary embodiment of a handset capable of setting FM/AM alarm clock without plugging in an external earphone. The handset 800 comprises an earphone jack 301, a FM/AM unit (low-band unit) 302, an internal antenna device 303, a first amplifier 309, a speaker 305 and a baseband unit 802. The third terminal C of the phone jacket 301 is coupled to the antenna terminal 307 and the signal-feeding terminal T1 of the internal antenna device 303. Alternative arrangement of the internal antenna device 303 is to couple the signal-feeding terminal T1 and the terminal T2 respectively to the antenna terminal 307 and the third terminal C, without connecting the third terminal C and the antenna terminal 307.

The baseband unit 802 comprises a RTC (real time clock) timer 804, a GPIO (general purpose input/output) port 806 and a second amplifier 808. Alarm time can be set to the RTC timer 804. When the RTC timer 804 arrives at the set time, the RTC timer 804 sends a control signal through the GPIO port 806 to activate the FM/AM unit 302 to receive FM/AM signals through the internal antenna device 303. FM/AM unit 302 generates stereo audio signals Ste_R and Ste_L to the speaker 305 through the second and first amplifiers 808, 304, thus completing FM/AM alarm function (clock), without plugging in the external earphone.

FIG. 9 shows an exemplary embodiment of a handset 900 capable of performing timed recording function without plugging in an external earphone. In FIG. 9, the baseband unit 802 further comprises a recorder 902 coupled between the GPIO port 806 and the stereo audio signals Ste_R and Ste_L. A recording time can be set to the RTC timer 804. When the RTC timer 804 arrives at the set time, the RTC timer 804 sends a control signal through the GPIO port 806 to activate the FM/AM unit 302 (if the FM/AM is not turned on) to receive FM/AM signals through the internal antenna device 303. Recorder 902 is controlled through the GPIO port 806 to record the stereo audio signals Ste_R and Ste_L, thus completing timed-recording function.

In FIG. 10, the handset 950 further comprises a Bluetooth unit 904 coupled to the stereo audio signals Ste_R and Ste_L. The Bluetooth unit 904 outputs the stereo audio signals through its antenna 906, allowing FM/AM radio programs to be output to a Bluetooth earphone or any Bluetooth equipped devices. Bluetooth is used here as an example of short-range wireless communication systems for brevity.

Mobile communication devices according to the invention have internal antenna devices for receiving low-band signals of operating frequency band below 1 GHz, and the internal antenna devices can be connected in series or parallel with external antennas such as earphones. Hence, the mobile communication devices (with low-band units) of the invention receive low-band broadcasting programs (such as FM/AM or DTV programs) without requiring external earphones.

The mobile communication devices of the invention further receive low-band signals (such as FM/AM signals) without requiring external earphones acting as external antennas. The mobile communication devices can drive the low-band units to perform radio (broadcast) alarm and timed recording without plugging in external earphones.

In addition, the mobile communication devices of the invention can further have Bluetooth units provided therein, such that users can listen FM/AM radio programs with Bluetooth earphones.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile communication device, comprising:
an earphone jack comprising at least a first, second and third terminals, the first and second terminals coupling audio signals to an external earphone plugged into the earphone jack, the third terminal defined to connect an auxiliary conduction line of the external earphone;
a low-band unit processing low-band signals to generate the audio signals, comprising an antenna terminal; and
an internal antenna device, provided inside the mobile communication device, comprising a signal-feeding terminal and a second terminal respectively coupled to the antenna terminal and the third terminal.

2. The mobile communication device as claimed in claim 1, further comprising an inductive device coupled between the antenna terminal and a reference ground.

3. The mobile communication device as claimed in claim 2, further comprising a matching circuit coupled between the signal-feeding terminal and the antenna terminal.

4. The mobile communication device as claimed in claim 1, wherein the low-band unit receives the low-band signals through the internal antenna device when the external earphone is not plugged into the earphone jack.

5. The mobile communication device as claimed in claim 4, wherein the internal antenna device operates in a frequency band below 1 GHz.

6. The mobile communication device as claimed in claim 5, wherein the low-band unit is a FM/AM unit or digital TV unit.

7. The mobile communication device as claimed in claim 6, further comprising a baseband unit comprising at least a RTC (real time clock) timer, the baseband unit activating the low-band unit to output the audio signals when the RTC timer reaches a predetermined time.

8. The mobile communication device as claimed in claim 7, the baseband unit further comprising a recorder coupled to the audio signals, the recorder is driven to perform timed recording of the audio signals when the RTC timer reaches the predetermined time.

9. The mobile communication device as claimed in claim 6, further comprising a Bluetooth unit coupled to the audio signals to transmit the audio signals to a Bluetooth earphone.

* * * * *